United States Patent [19]

Marsh

[11] E Re. 29,156

[45] Reissued* Mar. 22, 1977

[54] FUEL BY-PRODUCTS OF MUNICIPAL REFUSE

[75] Inventor: Paul G. Marsh, Hamilton, Ohio

[73] Assignee: Black Clawson Fibreclaim, Inc., New York, N.Y.

[ * ] Notice: The portion of the term of this patent subsequent to Jan. 30, 1990, has been disclaimed.

[22] Filed: Jan. 27, 1976

[21] Appl. No.: 652,756

Related U.S. Patent Documents

Reissue of:

[64] Patent No.: 3,830,636
Issued: Aug. 20, 1974
Appl. No.: 203,295
Filed: Nov. 30, 1971

U.S. Applications:

[63] Continuation-in-part of Ser. No. 94,084, Dec. 1, 1970, Pat. No. 3,736,223, which is a continuation-in-part of Ser. No. 14,431, Feb. 26, 1970, abandoned, and a continuation-in-part of Ser. No. 99,554, Dec. 18, 1970, Pat. No. 3,714,038.

[52] U.S. Cl. ..... 44/1 D; 110/8 R

[51] Int. Cl.[2] ..... C10L 5/00; F23G 3/00; F23G 5/00

[58] Field of Search ..... 44/1 R, 1 D; 110/8 R

[56] References Cited

UNITED STATES PATENTS

| | | | |
|---|---|---|---|
| 3,506,414 | 4/1970 | Skendrovic | 44/1 R |
| 3,549,092 | 12/1970 | Baxter, Jr. | 241/15 |
| 3,597,308 | 8/1971 | Brooks | 110/8 R X |
| 3,714,038 | 1/1973 | Marsh | 210/59 |

*Primary Examiner*—Carl F. Dees
*Attorney, Agent, or Firm*—Biebel, French & Nauman

[57] ABSTRACT

Municipal refuse is treated to produce a particulate mixture consisting essentially of its organic constituents substantially free of inorganic materials, the particles in the mixture being of less than a predetermined maximum particle size, and the mixture also being characterized on a volumetric unit basis by (a) substantial homogeneity of component materials, (b) substantial uniformity from the standpoint of distribution of particle sizes, (c) substantially uniform moisture content, and (d) substantially uniform fuel value. This mixture has many possible uses, including directly as fuel, as raw material for conversion by pyrolysis or hydrogenation, as raw material for the production of hardboard, and as compost or landfill.

10 Claims, 1 Drawing Figure

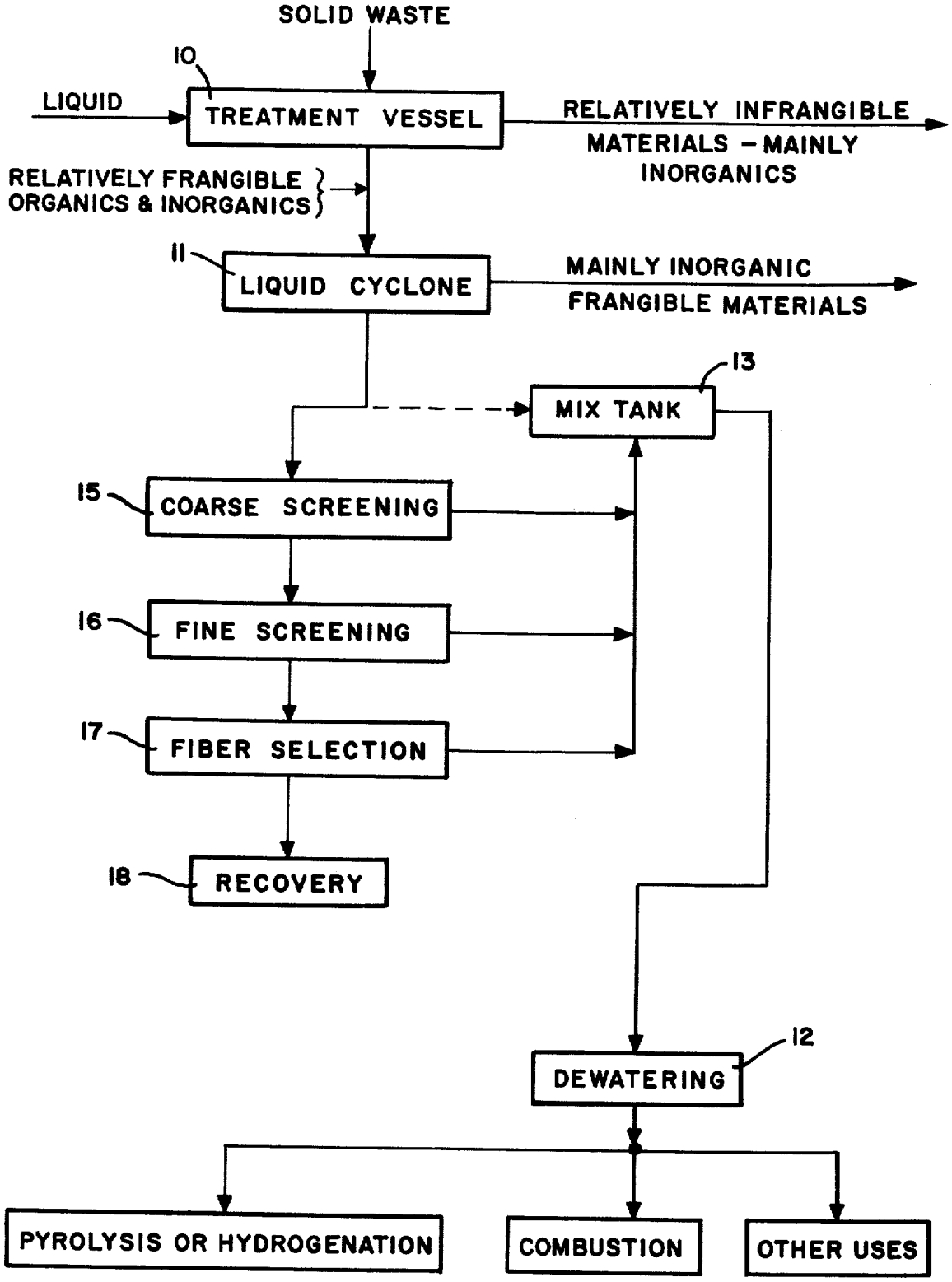
SOLID WASTE
10
LIQUID
TREATMENT VESSEL
RELATIVELY INFRANGIBLE MATERIALS – MAINLY INORGANICS
RELATIVELY FRANGIBLE ORGANICS & INORGANICS
11
LIQUID CYCLONE
MAINLY INORGANIC FRANGIBLE MATERIALS
13
MIX TANK
15
COARSE SCREENING
16
FINE SCREENING
17
FIBER SELECTION
18
RECOVERY
12
DEWATERING
PYROLYSIS OR HYDROGENATION
COMBUSTION
OTHER USES

FUEL BY-PRODUCTS OF MUNICIPAL REFUSE

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of application Ser. No. 94,084, filed Dec. 1, 1970, now U.S. Pat. No. 3,736,223 issued May 29, 1973 which is a continuation-in-part of application Ser. No. 14,431 filed Feb. 26, 1970 and now abandoned, and it is also a continuation-in-part of application Ser. No. 99,554 filed Dec. 18, 1970 now U.S. Pat. No. 3,714,038 issued Jan. 30, 1973. Specific reference is also made to my U.S. Pat. No. 3,549,011 and my patent with Earl T. Blakley No. 3,549,010, both issued Dec. 2, 1970.

BACKGROUND OF THE INVENTION

Solid waste materials of the type typified by municipal waste have traditionally presented problems of disposal which have become increasingly critical in recent years as a result of not only a rapidly increasingly population but the compounding difficulty of a drastic increase in per capita production of solid waste. Conventionally, such solid waste has been disposed of by such means as incineration and landfill. Obviously, with the ever increasing concern with problems of natural resources and the dwindling supply of acreage suitable for landfill operations within a reasonable distance of population centers, both of these methods of solid waste disposal are becoming less acceptable.

At the same time that both population and the per capita production of refuse have been increasing, the consumption of paper products has also shown a dramatic rise. Largely accountable for this rise has been the supplanting of metal, wood and glass as packaging materials by paper and the increased use of paper disposables such as paper cups, plates, napkins, and in more recent years garments and bedding. As a result, the proportion of municipal refuse constituted by paper products presently approaches, and in all likelihood will soon exceed, half of the total amount of such refuse. Thus the composition of typical municipal refuse by undried weight has recently been analyzed by American Paper Institute as follows:

TABLE I

| | |
|---|---|
| Glass, ceramics and stones | 10% |
| Metal | 8% |
| Wood | 7% |
| Garbage | 12% |
| Grass and dirt | 10% |
| Textiles | 3% |
| Plastic film | 2% |
| Leather, molded plastic and rubber | 2% |
| Paper | 46% |

In "An Interim Report; 1968 National Survey of Community Solid Waste Practices," U.S. Dept. of HEW, Environmental Control Administration, the typical composition of municipal refuse is given as follows:

TABLE II

| Component | Wet Basis % | Dry Basis % |
|---|---|---|
| Metals | 9 | 11 |
| Glass | 8 | 10 |
| Dirt | 3 | 3 |
| Food Waste | 19 | 17 |
| Plastics | 4 | 5 |
| Yard Waste | 4 | 4 |
| Cloth | 3 | 3 |
| Wood | 2 | 2 |
| Paper | 48 | 45 |

In a similar analysis made by the assignee of the present invention, the constituents of municipal refuse for a particular community were found to be as follows:

TABLE III

| Components | Wet Basis % | Dry Basis % |
|---|---|---|
| Metals, glass and dirt | 20 | 27 |
| Food wastes, cloth, plastic, wood, vegetation and other organics | 30 | 20 |
| Paper | 50 | 53 |

Such wastes average 75 percent solids and 25 percent liquids, although the liquid portion has been observed to vary between 20 percent and 40 percent.

SUMMARY OF THE INVENTION

The above applications describe new methods and systems for treating municipal refuse, not only in preparation of ultimate disposal, but also for processing in such manner as to recover various of its component materials of sufficiently high quality that their recovery is both economically feasible and commercially attractive, typical such recovered components being ferrous metals, aluminum, glass, and papermaking fibers. The invention described and claimed below is specifically directed to the recovery for reuse of another category of the components of municipal refuse, namely the organic residue from which the inorganic materials have been removed.

In the preferred practice of this invention, municipal refuse is first treated in pulping apparatus to reduce as many as possible of its frangible constituents, both organic and inorganic, to a pumpable slurry of mixed particles in an aqueous carrier, and with all of the particles in the slurry being of less than a predetermined maximum size. This slurry is then subjected to one or more cleaning operations capable of removing substantially all of the insoluble inorganic materials, namely the metals, glass and ceramics, stones, and other "grit" or dirt.

Upon completion of these steps, the solids in the resulting slurry will be a particulate mixture consisting essentially of paper fibers and the other organic materials listed in the foregoing Tables, but in relatively much more dilute concentration because of the consistency requirements of the pulping and cleaning steps. Upwards of 65 percent of these solids will be paper fibers, and it is contemplated that the best of these fibers may be removed by selective screening for reuse, since the present invention is particularly concerned with reuse of the other organic materials in the slurry.

Whether or not some of the paper fibers are recovered separately, the slurry of organic materials should be dewatered to a substantially higher solids content, e.g. 30–60 percent, before further processing. The product resulting from this stage of treatment will be a particulate mixture consisting essentially of the above organic constituents of municipal refuse substantially free of inorganic materials, and with the particles in the mixture all being of less than the desired maximum particle size. In addition, examination of the mixture on any convenient volumetric unit basis will establish that it possesses a high degree of uniformity from the standpoint of (a) homogeneity of its component materials, (b) distribution of particle sizes, and (c) moisture content.

The unique physical characteristics of this mixture outlined in the preceding paragraph contribute to its use for a variety of purposes for which it is also especially suited by reason of additional properties. In particular it has uniform and relatively high heat value, namely, 7,500–8,000 BTU per dry pound, which can be utilized in a variety of ways. For example, if the residue material is incinerated as a means of ultimate disposal, the heat generated by its combustion can be recovered by a suitable heat exchanger for reuse. The mixture is an ideal raw material for treatment such as pyrolysis or hydrogenation, as disclosed in application Ser. No. 99,554, in order to convert it to activated carbon or other forms of fuel. It is also suited for direct combustion as the fuel for a power boiler designed for fossil fuels. It is particularly advantageous for fuel use because of its low sulfur content. Other advantages and applications of the invention are pointed out hereinafter.

A BRIEF DESCRIPTION OF THE DRAWING

The single FIGURE shows alternative process steps involved in producing the product of the present invention.

DESCRIPTION OF THE PREFERRED EMBODIMENT

For purposes of illustration, the present invention will be described in conjunction with the treatment of municipal refuse having the general range of component materials listed in groups in Table III. This heterogeneous material is deposited in a treatment vessel 10 with sufficient water to dilute it to a solids content of the order of 4 percent to 6 percent, and subjected to mechanical and hydraulic shear forces of sufficient intensity to reduce the relative frangibility portions of the refuse to a pulpable consistency. Patent No. 3,595,488, of which I am a co-inventor, shows a treatment vessel particularly suited for this purpose and from which the reduce frangible portions of the solid waste may be continuously extracted for further treatment.

With this type of treatment vessel, relatively infrangible materials, mainly consisting of inorganics such as metals, are readily withdrawn separately from the slurry for disposal through salvage or other appropriate methods. The frangible materials, on the other hand, are reduced to a maximum particle size determined by the hole sizes in the perforated extraction plate with which the vessel is equipped, and preferred results for the purposes of this invention have been obtained with circular holes 1 inch in diameter.

The slurry of relatively frangible materials, extracted from the treatment vessel, including both organic and inorganic components, is then readily separated centrifugally by a liquid cyclone 11 or similar apparatus into a primarily organic fraction and a primarily inorganic fraction. The inorganic fraction, which consists mainly of aluminum and glass, may be subjected to separate salvage operations for recovery of the valuable components thereof or other disposition. The invention is concerned with the organic materials in the accepts fraction from the liquid cyclone, which typically includes approximately 70 percent to 80 percent of the original solid component materials of the refuse, with paper fibers constituting about two-thirds of the total.

This primary organic fraction will be in highly dilute condition when it leaves the liquid cyclone. If it is desired to utilize it without further subdivision, this can be done, but the surplus water should first be eliminated at a suitable dewatering station 12 such as a screw press. It is desirable to provide a mix tank 13 ahead of the dewatering station 12, and this mix tank should be of relatively large capacity for example 30,000 gallons, to provide for increased homogeneity of the slurry by effective averaging of the residue of the refuse delivered to the treatment vessel 10.

The dewatered particulate mixture will possess all of the characteristics of uniformity outlined above, and as already indicated, the maximum particle size will have been determined by the size of the holes in the extraction plate from the treatment vessel. Tests show that the largest particles will ordinarily be pieces of plastic sheeting which may be as large as a couple of inches square but which were able to pass through 1-inch holes because they were rolled or wadded sufficiently to do so.

A substantial portion of the paper fibers contained in the accepts fraction from the liquid cyclone are of sufficiently high quality to justify their reclamation for reuse as disclosed in application Ser. No. 94,084. The primary steps for this purpose are represented in the drawing as comprising stations 15, 16 and 17 for successive steps of coarse screening (0.125 inch perforations), fine screening (0.062 inch perforations), and the selection of the relatively long fibers and their delivery to a recovery station 18. Each of these steps results in a substantial reject fraction, which will usually include in the aggregate more than 50 percent of the paper fibers and all but a very small minor fraction of the other organic solids. As shown in the drawing, each of these reject fractions is delivered to the mix tank 13 prior to dewatering at station 12. The extent of dewatering may be controlled as desired within the capacity of the particular dewatering apparatus, and in accordance with the end use of the dewatered product, a practical range being a solids content of 30 to 60 percent on an oven dry basis.

It will accordingly be apparent that the only significant difference between the product produced by dewatering the accepts fraction from the liquid cyclone and the product produced by combining the reject fractions from the successive steps for fiber recovery is that the latter product will contain approximately half as much paper fiber as the product. Otherwise, these products will possess the same properties of substantial homogeneity of component material, substantial uniformity from the standpoint of maximum particle size and distribution of particle sizes, and substantially uniform moisture content.

In the practice of the invention, if there is a market for reclaimed paper fiber within a convenient shipping range of the waste treatment plant, it will be advantageous to recover the best of the paper making fibers as described in my above Pat. No. 3,736,223, since they should have a substantially higher salvage value for that purpose than as part of the organic residue. This in turn will have the effect of reducing the paper content of the residue to approximately 60 percent of the total of solid materials on an oven dry basis, which also offers advantages for some uses of the mixture and does not detract from its advantages for other uses.

To amplify the point just noted, if the organic material is to be used as raw material for the production of hardboard by heat and pressure, removal of some of the paper increases the percentage of plastic remaining in the mixture to as much as 8 percent or higher, and this may be adequate by itself as a binder for the other components. Similarly recovery of the fibers of the best quality will result in increasing the percentage of fines in the residue, which will contribute to the density of hardboard produced therefrom.

If a screen with 0.125-inch perforations is used at the coarse screening station 15, the material rejected thereby is well suited for use by itself for the manufacture of hardboard, because it will contain most of the original plastic, wood particles, and textiles as well as a substantial quantity of paper fiber. The composition of a typical example of this reject material will comprise approximately 40–50 percent paper, 15–25 percent plastic, and 20–25 percent textiles and wood particles, with this entire mixture totalling approximately 10–15 percent of the organic solids extracted from the treatment vessel 10 through perforations 1 inch in diameter. Further, if this material is used by itself, the reject from the fine screening and fiber selection steps is also well suited for conversion to a better grade (cleaner and finer material) hardboard with the aid of a conventional binder resin, heat and pressure.

Selective removal of paper is also desirable if the organic residue is to be used as compost or landfill, because paper is more resistant to biological decomposition than the other components of the mix. If, on the other hand, the organic residue is to be used as fuel, either directly or after subjection to pyrolysis or hydrogenation, removal of some of the paper does not decrease the fuel value of the remainder of the mix. Another possible use for the material of the invention is conversion to animal food, such as for cattle, in which case the paper can be retained because its cellulosic composition has nutritional value.

The physical properties of the mixture contribute to its use for each of the purposes noted above. In particular, the controlled maximum particle size and the uniformity of distribution of component materials and particle sizes in a given volumetric unit provide other attributes of the mix, including fuel value, minimized bulk, consistency of hardboard made therefrom, and uniform rate of decomposition as compost or landfill. These physical properties, together with the high percentage of fibrous constituents in the mixture, are also advantageous if the mixture is disposed of by incineration, particularly, if, as disclosed in my joint Pat. No. 3,549,010 with Earl T. [sludge] *Blakley* sewage sludge is added to the slurry in conjunction with the dewatering step.

While the product herein described constitutes a preferred embodiment of the invention, it is to be understood that the invention is not limited to this product, and that changes may be made therein without departing from the scope of the invention.

What is claimed is:

[1. As a new product, a particulate mixture consisting essentially of organic consistuents of municipal refuse substantially free of inorganic materials, and prepared by a process comprising the steps of:

1. depositing solid waste materials including relatively frangible and infrangible organic and inorganic solids and a liquid medium in a treatment vessel,
2. subjecting said solids in the presence of said liquid medium in said treatment vessel to forces of sufficient intensity to reduce said relatively frangible organic and inorganic solids to particles of less than a predetermined maximum size forming a mixture with said liquid medium,
3. removing from said treatment vessel in slurry form a portion of said liquid medium and such of said organic and inorganic particles as pass through perforations sized to pass only particles of less than said predetermined maximum size,
4. removing from said treatment vessel separately from said slurry said relatively infrangible solids,
5. removing from said slurry the inorganic constituents thereof, and
6. removing from the resulting slurry of said organic solids and liquid medium a substantial portion of said liquid medium to leave said particulate mixture, the major component material of said mixture being cellulose fibers, the particles in said mixture being of less than predetermined maximum particle size, and said mixture having the following additional characteristics on a volumetric unit basis:
   a. substantial homogeneity of component materials;
   b. substantial uniformity from the standpoint of distribution of particle sizes;
   c. substantially uniform moisture content; and
   d. substantially uniform fuel value.]

2. The product defined in claim 1 wherein said mixture also includes significant amounts of plastic, food waste, vegetation and textile materials.

3. The product defined in claim 1 wherein all of said particles are sufficiently small to pass through a screen member having circular openings not greater than one inch in diameter.

4. The product defined in claim 1 wherein said uniform moisture content comprises 40–70 percent of said mixture.

5. The product defined in claim 1 wherein all of said particles are sufficiently small to pass through a screen member having circular openings approximately one-eighth inch in diameter.

6. The product defined in claim 3 wherein said maximum size particles are not sufficiently small to pass through a screen member having circular openings approximately one-eighth inch in diameter.

7. The product defined in claim 2 wherein cellulose fibers constitute approximately 80 percent of said mixture.

8. The product defined in claim 2 wherein cellulose fibers constitute approximately 60 percent of said mixture.

9. The product defined in claim 2 wherein cellulose fibers constitute approximately 40–50 percent of said mixture, and said maximum size particles are not sufficiently small to pass through a screen member having circular openings approximately one-eighth inch in diameter.

10. A process for [ preparing ] *converting* municipal solid waste *into fuel* for combustion *which has the following characteristics on a volumetric unit basis:*

*i. substantial homogeneity of component materials,*

*ii. substantial uniformity from the standpoint of distribution of particle sizes,*

*iii. substantially uniform moisture content, and*

*iv. substantially uniform fuel value,* comprising the steps of:

a. depositing municipal solid waste, including relatively frangible and infrangible organic and inorganic solids, in a treatment vessel together with a liquid medium in sufficient volume to establish a solids content of the order of 4 to 6 percent, b. subjecting said solids in the presence of said liquid medium in said treatment vessel to mechanical and hydraulic forces of sufficient intensity to reduce said relatively frangible organic and inorganic solids to particles of a predetermined maximum size forming a mixture with said liquid medium, c. removing from said treatment vessel in slurry form a portion of said liquid medium and such of said organic and inorganic particles as pass through perforations of the order of one inch in diameter, d. removing said relatively infrangible solids from said treatment vessel separately from said slurry, e. removing from said slurry the inorganic constituents thereof, f. accumulating a substantial volume of the resulting slurry to assure the homogeneity thereof, and g. removing from the resulting slurry of said organic solids and liquid medium a substantial portion of said liquid medium.

*11. As a new product, a particulate mixture consisting essentially of organic constituents of municipal refuse substantially free of inorganic materials, and prepared by a process comprising the steps of:*

*1. depositing solid waste materials including relatively frangible and infrangible organic and inorganic solids and a liquid medium in a treatment vessel,*

*2. subjecting said solids in the presence of said liquid medium in said treatment vessel to forces of sufficient intensity to reduce said relatively frangible organic and inorganic solids to particles of less than a predetermined maximum size forming a mixture with said liquid medium,*

*3. removing from said treatment vessel in slurry form a portion of said liquid medium and such of said organic and inorganic particles as pass through perforations sized to pass only particles of less than said predetermined maximum size,*

*4. removing said relatively infrangible solids from said treatment vessel separately from said slurry,*

*5. removing from said slurry the inorganic constituents thereof,*

*6. accumulating a substantial volume of the resulting slurry of said organic solids and liquid medium to assure the homogeneity thereof, and*

*7. removing from said accumulated slurry a substantial portion of said liquid medium to leave said particulate mixture,*

*the major component material of said mixture being cellulose fibers, the particles in said mixture being of less than a predetermined maximum particle size, and said mixture having the following additional characteristics on a volumetric unit basis:*

*a. substantial homogeneity of component materials;*

*b. substantial uniformity from the standpoint of distribution of particle sizes;*

*c. substantially uniform moisture content; and*

*d. substantially uniform fuel value.*

* * * * *

UNITED STATES PATENT AND TRADEMARK OFFICE

CERTIFICATE OF CORRECTION

PATENT NO. : RE 29,156
DATED : March 22, 1977
INVENTOR(S) : Paul G. Marsh

It is certified that error appears in the above-identified patent and that said Letters Patent are hereby corrected as shown below:

Column 6, line 39, change "1" to --- 11 ---.

Column 6, line 42, change "1" to --- 11 ---.

Column 6, line 46, change "1" to --- 11 ---.

Column 6, line 49, change "1" to --- 11 ---.

Signed and Sealed this

Twenty-first Day of June 1977

[SEAL]

*Attest:*

RUTH C. MASON
*Attesting Officer*

C. MARSHALL DANN
*Commissioner of Patents and Trademarks*